(12) United States Patent
Troia et al.

(10) Patent No.: US 10,862,538 B2
(45) Date of Patent: Dec. 8, 2020

(54) TRANSMISSION OF VEHICLE ROUTE INFORMATION BY PASSIVE DEVICES

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/993,119

(22) Filed: May 30, 2018

(65) Prior Publication Data

US 2019/0372622 A1 Dec. 5, 2019

(51) Int. Cl.
*H04B 5/00* (2006.01)

(52) U.S. Cl.
CPC ......... *H04B 5/0031* (2013.01); *H04B 5/0056* (2013.01)

(58) Field of Classification Search
CPC .. G06K 7/10376; G08G 1/108; G05D 1/0259; G05D 2201/0213
USPC ......... 455/99, 95.2; 340/439, 575, 576, 917, 340/919, 22
See application file for complete search history.

(56) References Cited

U.S. PATENT DOCUMENTS

| | | | |
|---|---|---|---|
| 7,557,731 B2 | 7/2009 | Ramasubbu | |
| 2010/0039293 A1 | 2/2010 | Philippe et al. | |
| 2010/0156632 A1* | 6/2010 | Hyland | G08B 25/009 340/540 |
| 2012/0075067 A1* | 3/2012 | Attaluri | H04Q 9/00 340/10.1 |
| 2012/0098657 A1* | 4/2012 | Bogatine | G08G 1/167 340/439 |
| 2012/0275445 A1* | 11/2012 | Karlsson | H04B 1/3816 370/338 |
| 2016/0048712 A1* | 2/2016 | Butler | H01Q 1/38 340/10.51 |
| 2016/0132705 A1* | 5/2016 | Kovarik | G06K 7/10376 340/10.3 |
| 2016/0379495 A1* | 12/2016 | Engelen | G08G 1/144 340/932.2 |
| 2018/0186454 A1* | 7/2018 | Luckay | G05D 1/0094 |
| 2018/0268279 A1* | 9/2018 | Lee | G06K 19/0702 |

(Continued)

FOREIGN PATENT DOCUMENTS

| | | |
|---|---|---|
| KR | 10-2007-0110574 A | 11/2007 |
| KR | 10-2008-0039169 A | 5/2008 |

(Continued)

OTHER PUBLICATIONS

Happich, "RFID Sensor Tags to Monitor Road Conditions", Feb. 16, 2015, (1 pg.), eeNews Europe, dated Feb. 16, 2015, retrieved from http://www.eenewseurope.com/news/rfid-sensor-tags-monitor-road-conditions.

(Continued)

*Primary Examiner* — Kathy W Wang-Hurst
*Assistant Examiner* — Max Mathew
(74) *Attorney, Agent, or Firm* — Brooks, Cameron & Huebsch, PLLC

(57) ABSTRACT

A method can include energizing, by a vehicle, a passive wireless communication device along a route over which the vehicle is traveling; and transmitting information about the route from the energized wireless communication device to the vehicle.

4 Claims, 4 Drawing Sheets

(56) References Cited

U.S. PATENT DOCUMENTS

| | | | |
|---|---|---|---|
| 2019/0129419 A1* | 5/2019 | Lee | G05D 1/0223 |
| 2019/0213902 A1* | 7/2019 | Bender | G09B 9/05 |
| 2019/0359272 A1* | 11/2019 | Stross | B62D 53/068 |
| 2019/0385449 A1* | 12/2019 | Pateropoulos | G08G 1/04 |

FOREIGN PATENT DOCUMENTS

| | | |
|---|---|---|
| KR | 10-0858926 B1 | 9/2008 |
| KR | 10-2010-0083060 A | 7/2010 |

OTHER PUBLICATIONS

International Search Report and Written Opinion from related international application No. PCT/US2019/025149, dated Jul. 18, 2019, 12 pages.

\* cited by examiner

TRANSMISSION OF VEHICLE ROUTE INFORMATION BY PASSIVE DEVICES

TECHNICAL FIELD

The present disclosure relates generally to apparatus and methods related to vehicles, and more particularly, to transmission of vehicle route information by passive devices.

BACKGROUND

Motor vehicles, such as autonomous and/or non-autonomous vehicles, (e.g., automobiles, cars, trucks, buses, etc.) can use sensors and/or cameras obtain information about their surroundings so that they can operate safely. For example, autonomous vehicles can control their speed and/or direction and can recognize and/or avoid obstacles and/or hazards based on information obtained from sensors and/or cameras. For example, vehicles may use light detection and ranging (LIDAR), vehicle-to-everything (V2X), RADAR, and/or SONAR detection techniques, among others, to obtain information about their surroundings. As used herein, an autonomous vehicle can be a vehicle in which at least a portion of the decision-making and/or control over vehicle operations is controlled by computer hardware and/or software/firmware, as opposed to a human operator. For example, an autonomous vehicle can be a driverless vehicle.

DETAILED DESCRIPTION

Embodiments of the present disclosure include passive wireless communication devices, such as passive near field tags, along a route (e.g., a road) traveled by vehicles, such as autonomous vehicles and/or non-autonomous vehicles. The vehicles can supply power to (e.g., energize) the communication devices. The energized communication devices can provide information about the route to the vehicles. The information can be used to make decisions about the operation of the vehicles, such as the speed and/or direction of travel of the vehicles, or the like.

In previous approaches, vehicles have used cameras and sensors to obtain information about their surroundings. However, the operation of these cameras and sensors can depend on weather conditions and can be hampered by inclement weather conditions. The passive wireless communication devices can provide redundancy that can improve vehicle operation, resulting in technological improvements to the vehicle. For example, information provided by the passive wireless communication devices can be used if cameras and/or sensors fail, such as due to weather-related events.

In some previous approaches, vehicles have used sensors, such as vehicle to infrastructure (V2I) sensors, to obtain route information from infrastructure components along a route, such as overhead radio frequency identification (RFID) readers, cameras, traffic lights, lane markers, streetlights, signage, parking meters, or the like. However, infrastructure components are typically powered by a power grid and can be susceptible to power grid outages. For example, communications between the vehicle and infrastructure components can be interrupted in the event of a power outage. This problem is solved by the present disclosure, in that the passive wireless communication devices are powered by the vehicle and can provide information to the vehicle regardless of whether a power grid outage occurs. This results in improved vehicles by improving vehicle performance.

Figure 1:
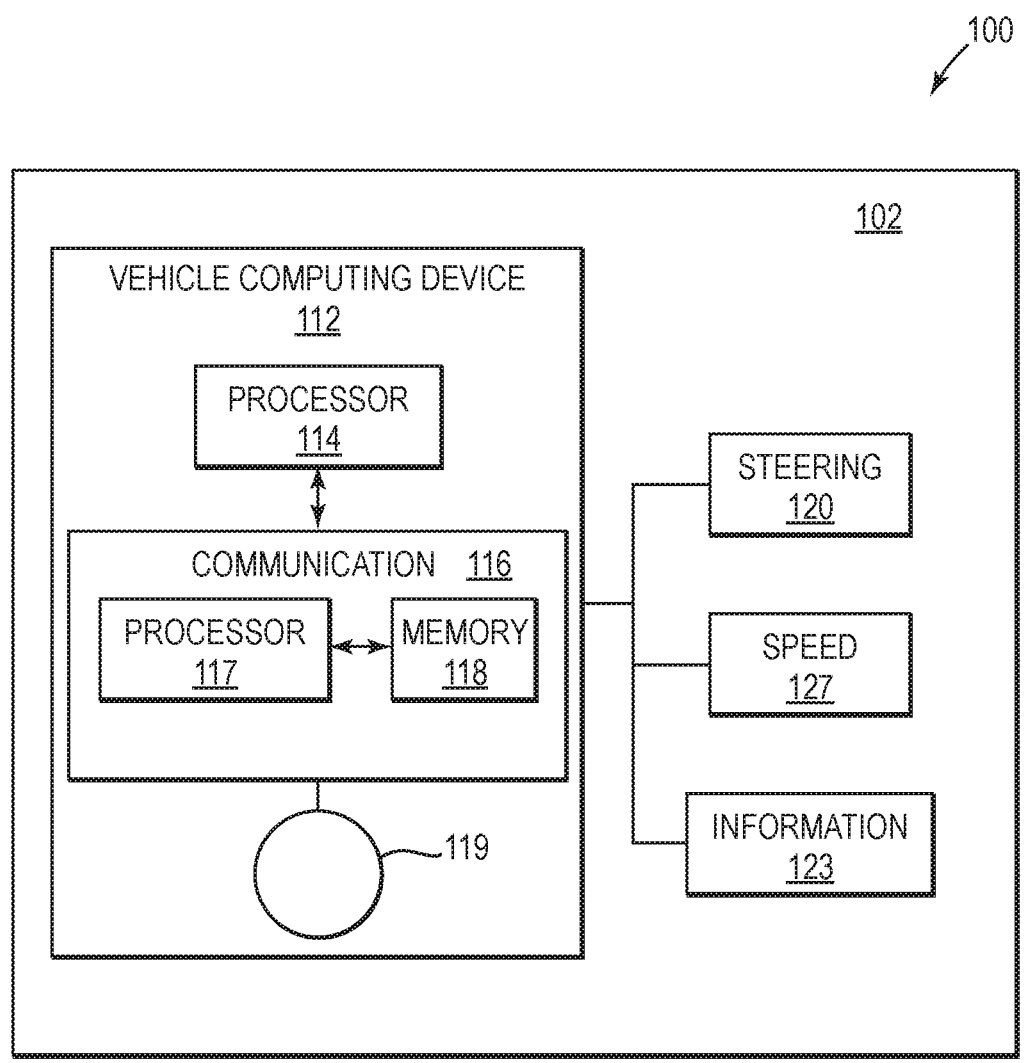
FIG. 1 is a block diagram of a system, such as a vehicle system, in accordance with a number of embodiments of the present disclosure.
Figure 1:
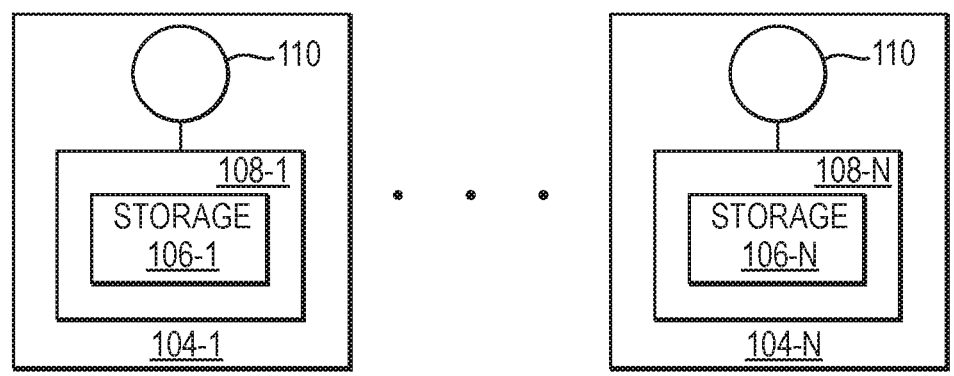

FIG. 1 is a block diagram of a system 100, such as a vehicle system, in accordance with a number of embodiments of the present disclosure. Vehicle system 100 includes a vehicle 102, such as an autonomous vehicle, a traditional non-autonomous vehicle, an emergency vehicle, a service vehicle, or the like, that can be referred to as an apparatus. System 100 includes a number of wireless communication devices 104-1 to 104-N, such as transmitters, transponders, transceivers, or the like. In some examples, wireless communication devices 104-1 to 104-N can be passive wireless communication devices that are powered (e.g., energized) by vehicle 102.

Wireless communication devices 104-1 to 104-N can be located along a route, such as a road, on which vehicle 102 can travel. In some examples, the route can include a number of roads. For example, wireless communication devices 104-1 to 104-N can be embedded in the roads, embedded and/or located on the walls of a tunnel along the route, located on signs, such as traffic signs, along the route, located in and/or on traffic-control lights along the route, located in and/or on other vehicles along the route, on (e.g., carried by and/or worn by) pedestrians along the route, or the like.

Wireless communication devices 104-1 to 104-N can transmit route information about the route to vehicle 102 in response to being powered by vehicle 102 and/or collect information from vehicle 102 in response to being powered by vehicle 102. In some examples, route information can include information that can affect the operation of vehicle 102 along the route, such as information that can affect the direction and/or the speed of vehicle 102 along the route. For example, vehicle 102 can make adjustments to its operation and/or indicate that adjustments should be made to its operation in response to the route information.

Wireless communication devices 104-1 to 104-N can be short-range wireless communication devices, such as near field communication (NFC) tags, RFID tags, or the like. Wireless communication devices 104-1 to 104-N respectively include non-volatile storage components 106-1 to 106-N that can be respectively integrated into chips 108-1 to 108-N, such as microchips. Each of the respective chips 108-1 to 108-N is coupled to a respective antenna 110. The respective storage components 106-1 to 106-N can store respective route information.

In some examples, wireless communication devices 104-1 to 104-N can be reprogrammable and can be wirelessly reprogrammed in situ. For example, wireless communication devices 104-1 to 104-N can be reprogrammed with updated route information to reflect changes to the road, such as due to road construction, flooding, bridge repairs, detours, lane closures, or the like. For examples in which wireless communication devices 104-1 to 104-N are NFC tags, a wireless device with NFC capabilities and application software that allows the device to reprogram the NFC tags can be used to reprogram the NFC tags.

Vehicle 102 includes a vehicle computing device 112, such as an on-board computer. Vehicle computing device 112 includes a processor 114 coupled to a communication component 116, such as a reader and/or writer, that is coupled to (e.g., or includes) an antenna 119. Communication component 116 can include a processor 117 coupled to a memory 118, such as a non-volatile flash memory.

Vehicle computing device 112 can control operational parameters of vehicle 102, such steering and speed. For example, controller can be coupled to a steering control system 120 and a speed control system 122. Vehicle computing device 112 can be coupled to an information system 123. Information system 123 can be configured to display a message, such as the route information, and can display visual warnings and/or output audible warnings.

In some examples, antennas 110 and 119 can be loop antennas configured as inductor coils, such as solenoids. Antenna 119 can loop around vehicle 102, for example. Antenna 119 can generate an electromagnetic field in response to current flowing through antenna 119. For example, the strength of the electromagnetic field can depend on the number of coils and the amount of current. The electromagnetic field generated by antenna 119 can induce current flow in an antenna 110 that powers the respective wireless communication device 104.

Antenna 119 can induce current flow in an antenna 110 when vehicle 102 brings antenna 119 to within a communication distance (e.g., a communication range) of the antenna 110. For example, the communication distance can depend on the strength of the electromagnetic field generated by antenna 119. The electromagnetic field generated by antenna 119 can be set, by the number of coils of antenna 119 and/or the current passing through antenna 119, such that the communication distance can span the left and right lanes of a road. In some examples, the communication distance can be about 50 centimeters to about 100 centimeters on either side of vehicle 102.

The respective wireless communication devices 104-1 to 104-N can respectively transmit their respective route information to communication component 116 in response to vehicle 102 passing within the communication distance of the respective wireless communication devices 104-1 to 104-N. For example, the respective wireless communication devices 104-1 to 104-N can respectively transmit their respective route information in response to being powered by communication component 116. The information can be transferred from wireless communication devices 104-1 to 104-N to communication component 116 in the form of signals, such as radio frequency signals. For example, communication devices 104-1 to 104-N and communication component 116 can communicate using radio frequency signals.

For examples in which wireless communication devices 104-1 to 104-N are NFC tags, communication component 116 can be an NFC reader and can communicate with wireless communication devices 104-1 to 104-N using an NFC protocol that can be stored in memory 118 for processing by processor 117. For example, communication component 116 and wireless communication devices 104-1 to 104-N can communicate at about 13.56 mega-Hertz according to the ISO/IEC 18000-3 international standard for passive RFID for air interface communications. For example, the information can be transmitted in the form of a signal having a frequency of about 13.56 mega-Hertz.

Communication component 116 can transmit the route information received from wireless communication devices 104-1 to 104-N to processor 114. Processor 114 can cause steering control system 120 to adjust the direction of vehicle 102 and/or speed control system 122 to adjust the speed of vehicle 102 in response (e.g., according) to the route information from communication component 116. For example, the route information can indicate the presence of a lane boundary, the presence of a pedestrian, the speed limit, the direction of the road (e.g., the road is straight or curves left or right), that there is a lane change, a detour, or the like. Processor 114 can cause information system 123 to display the route information from communication component 116, such as a distance to a construction zone, a lane change, a crossroad, railroad crossing, or a detour, the presence of a pedestrian, the presence of another vehicle, or the like.

In some examples, the communication distance may be set such that wireless communication devices 104-1 to 104-N are only activated when vehicle 102 is too close to wireless communication devices 104-1 to 104-N. For example, wireless communication devices 104-1 to 104-N can transmit information to communication component 116, indicating that vehicle 102 is too close. For example, wireless communication devices 104-1 to 104-N can be embedded in a road along a centerline and/or an edge of a road and/or located in another vehicle, and the transmitted information can indicate that vehicle 102 is too close to the centerline, the edge of the road, or the other vehicle. Communication component 116 can then transmit the information to processor 114. Processor 114 can cause information system 123 to display a visual warning and/or sound an audible alarm, indicating that vehicle 102 is too close to the centerline, the edge of the road, or the other vehicle. In some examples, processor 114 can cause steering system 120 to steer vehicle 102 away from the centerline, the edge of the road, or the other vehicle in response to the transmitted information.

Wireless communication devices 104-1 to 104-N can contain information that is specific to and recognized only by particular vehicles that form a particular subset of all the vehicles passing by wireless communication devices 104-1 to 104-N, such as emergency vehicles (e.g., police or fire vehicles ambulances, or the like) or service vehicles. In examples where vehicle 102 is such a vehicle, communication component 116 can be configured to recognize that information.

In some examples, a wireless communication device 104 can be used to collect information (e.g., traffic information), such as vehicle speeds, the number of vehicles passing by the communication device 104, or the like. Communication component 116 can be configured to energize a communication device 104 and write the information to the energized communication device 104. For example, the current vehicle speed and/or a date and time can be written to the communication device 104. The communication device 104 can collect such information from each vehicle that passes by communication device 104. For example, the information can be used to determine the number of vehicles passing by (e.g., the amount of traffic) on a particular day and time and/or the speeds of the vehicles on a particular date and time.

Each of the respective wireless communication devices 104-1 to 104-N can include different route information. However, wireless communication devices 104-1 to 104-N can be distributed over a relatively short distance of a road, and the route information might change relatively little from wireless communication device to wireless communication device. As such, if a vehicle 102 fails to receive information from a wireless communication device, vehicle 102 can receive information from another wireless communication device without a significant loss of information. For at least the same reason, in some examples, wireless communication devices that are immediately adjacent to each other, with no intervening wireless communication devices, can include the same information so that no information is lost if vehicle 102 fails to receive information from one of the wireless communication devices.

Wireless communication devices 104-1 to 104-N can be respectively worn or carried by different pedestrians along a road. For example, in response to being energized by communication component 116, wireless communication devices 104-1 to 104-N can respectively send messages to communication component 116 indicating the presence of the respective pedestrians.

Figure 3:
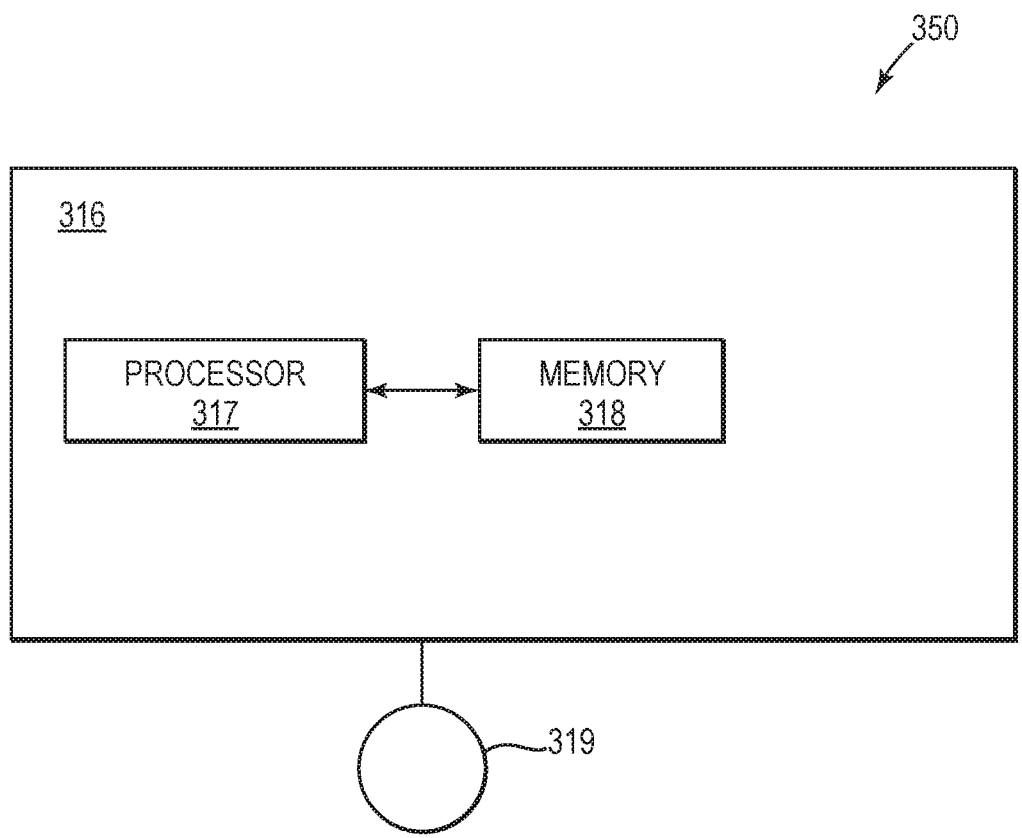
FIG. 3 illustrates a communications system in accordance with a number of embodiments of the present invention.
Figure 3:
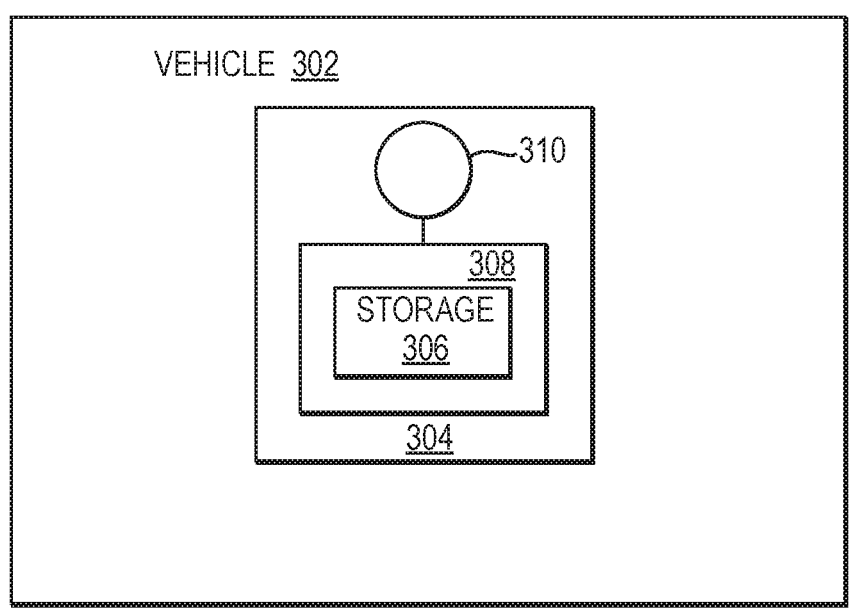

A vehicle, such as vehicle 102, can include a wireless communication device, such as a NFC tag, for paying tolls, as is discussed in conjunction with FIG. 3.

Figure 2:
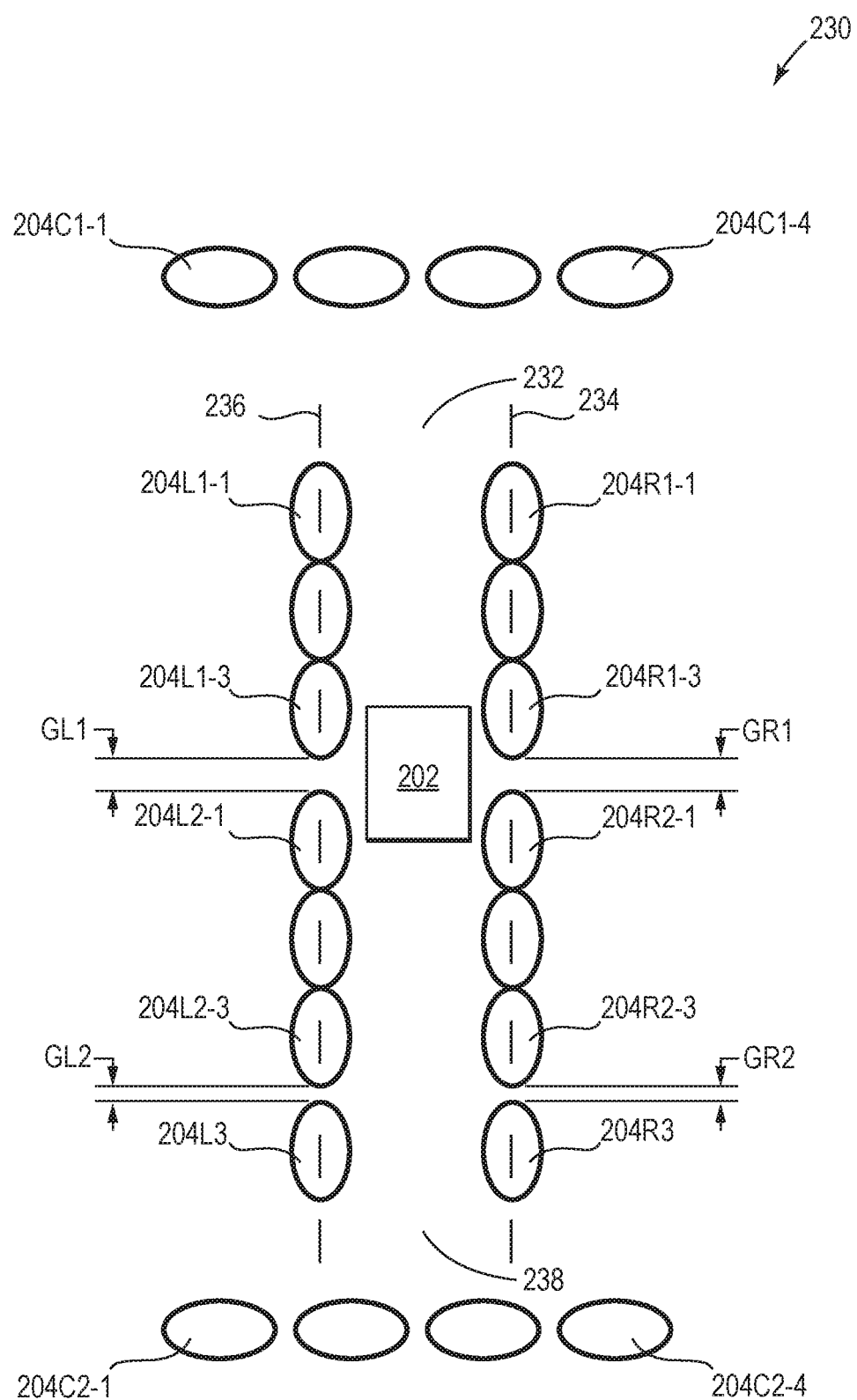
FIG. 2 illustrates an example of a system, such as a route information system, in accordance with a number of embodiments of the present disclosure.

FIG. 2 illustrates an example of a system, such as a route information system 230, in accordance with a number of embodiments of the present disclosure. For example, system 230 includes a number of wireless communication devices 204 that can be similar to (e.g., the same as) wireless communication devices 104 described previously. Wireless communication devices 204 can be along a route, such as a road 232 of the route. For example, wireless communication devices 204 can be embedded in road 232.

Wireless communication devices 204R are embedded in road 232 along a lane boundary, such as a lane marker 234, and wireless communication devices 204L are embedded along a lane marker 236. Lane markers 234 and 236 can define a lane 238 of road 232 in which a vehicle 202 is traveling. Vehicle 202 can be similar to (e.g., the same as) vehicle 102 described previously. As shown, there can be wireless communication devices 204 on either side of vehicle 204. In some examples, lane marker 234 can define the edge of road 232, such as adjacent to the shoulder of road 232, and lane marker 236 can be a center dividing line, dividing lane 238 from oncoming traffic.

The wireless communication devices 204R can be divided into sets, such as a set of wireless communication devices 204R1-1 to 204R1-3 in which wireless communication devices 204R1-1 to 204R1-3 are contiguous with no gaps therebetween, and a set of wireless communication devices 204R2-1 to 204R2-3 in which wireless communication devices 204R2-1 to 204R21-3 are contiguous with no gaps therebetween. There can be a gap GR1 between the set of wireless communication devices 204R1-1 to 204R1-3 and the set of wireless communication devices 204R2-1 to 204R2-3, and a gap GR2 between the set of wireless communication devices 204R2-1 to 204R2-3 and a wireless communication device 204R3.

The wireless communication devices 204L can be divided into sets, such as a set of wireless communication devices 204L1-1 to 204L1-3 in which wireless communication devices 204L1-1 to 204L1-3 are contiguous with no gaps therebetween, and a set of wireless communication devices 204L2-1 to 204L2-3 in which wireless communication devices 204L2-1 to 204L21-3 are contiguous with no gaps therebetween. There can be a gap GL1 between the set of wireless communication devices 204L1-1 to 204L1-3 and the set of wireless communication devices 204L2-1 to 204L2-3, and a gap GL2 between the set of wireless communication devices 204L2-1 to 204L2-3 and a wireless communication device 204L3. Each set of wireless communication devices can provide continuous route information, such as continuous repeated information, to vehicle 202, for example. Providing repeated information in such a continuous manner, for example, can help overcome issues associated with noise.

Vehicle 202 can energize the respective wireless communication devices when it comes within the communication distance of the respective wireless communication devices. For example, vehicle 202 can energize the wireless communication devices 204R when it gets too close to wireless communication devices 204R, and thus too close to lane marker 234, or vehicle 202 can energize the wireless communication devices 204L when it gets too close to wireless communication devices 204L, and thus too close to lane marker 236. The energized wireless communication devices can send a message to vehicle 202, indicating that vehicle is too close to the respective lane marker.

In some examples, the communication distance is such that vehicle 202 energizes one pair of wireless communication devices at a time, such as across a common location along road 232. For example, the pair can include one wireless communication device 204L from the left side of the lane (e.g., wireless communication device 204L1-3) and one wireless communication device 204R from the right side of the lane (e.g., wireless communication device 204R1-3) at a common location on road 232.

In some examples, the wireless communication devices of a particular set can include the same route information. For example, wireless communication devices 204L1-1 to 204L1-3 can include the same route information. Additionally, corresponding sets on the left and right sides of the lane, such as the set of wireless communication devices 204L1-1 to 204L1-3 and the corresponding set of wireless communication devices 204R1-1 to 204R1-3 can include the same route information, and the set of wireless communication devices 204L2-1 to 204L2-3 and the corresponding set of wireless communication devices 204R2-1 to 204R2-3 can include the same route information. However, different sets on the same side can include different information. For example, the wireless communication devices 204L1-1 to 204L1-3 can include the same information, and the wireless communication devices 204L2-1 to 204L2-3 can include the same information that is different than the information in wireless communication devices 204L1-1 to 204L1-3. Similarly, for example, the wireless communication devices 204R1-1 to 204R1-3 can include the same information, and the wireless communication devices 204R2-1 to 204R2-3 can include the same information that is different than the information in wireless communication devices 204R1-1 to 204R1-3.

In some examples, the respective communication devices 204L1-1 to 204L2-3 and the respective communication devices 204R1-1 to 204R2-3 can be respectively at common locations along road 232. The respective communication devices 204L1-1 to 204L2-3 can respectively include the same information as the respective communication devices 204R1-1 to 204R2-3, for example. However, the respective communication devices 204L1-1 to 204L2-3 can respectively include different information, and the respective communication devices 204R1-1 to 204R2-3 can respectively include different information.

The route information in the set of wireless communication devices 204L2-1 to 204L2-3 and the corresponding set of wireless communication devices 204R2-1 to 204R2-3 can indicate that the road is straight. The route information in the set of wireless communication devices 204L1-1 to 204L1-3 and the corresponding set of wireless communication devices 204R1-1 to 204R1-3 can indicate that the road is about to curve, there is an upcoming lane change or a detour, or the like.

Wireless communication devices 204C1-1 to 204C1-4 and wireless communication devices 204C2-1 to 204C2-4 can be distributed across lane 238 in a direction transverse to the direction of lane 238 and transverse to the direction in which vehicle 202 is traveling. Wireless communication devices 204C1-1 to 204C1-4 can include the same information as each other, and wireless communication devices 204C2-1 to 204C2-4 can include the same information and each other.

Wireless communication devices 204C1-1 to 204C1-4 and wireless communication devices 204C2-1 to 204C2-4 can be located just before respective crossroads that cross (e.g., intersect) road 232. For example, wireless communication devices 204C1-1 to 204C1-4 and wireless communication devices 204C2-1 to 204C2-4 can indicate that the respective crossroads are upcoming and/or can indicate the respective distances to the respective crossroads. Wireless communication devices 204C1-1 to 204C1-4 and wireless communication devices 204C2-1 to 204C2-4 can be embedded in lane 238 in the transverse direction.

Wireless communication devices 204C1-1 to 204C1-4 can be located before a railroad crossing and can indicate that the railroad crossing is upcoming and/or can indicate the distance to the railroad crossing. In some examples, wireless communication devices 204C1-1 to 204C1-4 and wireless communication devices 204C2-1 to 204C2-4 can be located in a traffic light and/or a traffic sign. In some examples, wireless communication devices 204C1-1 to 204C1-4 can be respectively on different pedestrians in a crosswalk across road 232.

Wireless communication devices 204L3 and 204R3 can be used to collect information, such as traffic information for lane 238. Vehicle 202 can write information, such as previously described in conjunction with vehicle 102, to wireless communication devices 204L3 and 204R3 when vehicle 202 passes (e.g., comes with the communication distance of) wireless communication devices 204L3 and 204R3, and thus energizes communication devices 204L3 and 204R3. A number of vehicles can write information to wireless communication devices 204L3 and 204R3. For example, as described previously, traffic patterns, such as vehicle speeds in lane 238 and/or the number of vehicles traveling in lane 238 (e.g., at particular times on particular dates) can be deduced from such information. Such information can be correlated with the weather, road construction, accidents, or the like.

FIG. 3 illustrates a communications system 350 in accordance with a number of embodiments of the present invention. System 350 can include a passive wireless communication device, such as a short-range communication device (e.g., an NFC tag 304) that can be as described previously. NFC tag 304 can be in a vehicle 302. Vehicle 302 can be configured as shown in FIG. 1 for vehicle 102 and include the components of vehicle 102 in addition to NFC tag 304. NFC tag 304 can include a chip 308 having a non-volatile storage component 306 that stores information, such as a user identity information, user financial information for paying a toll, and/or information about vehicle 302, such as the speed of vehicle 302, the number of passengers in vehicle 302, etc. NFC tag 304 can include an antenna 310.

System 350 can include a communications device 316, such an active communications device (e.g., that includes a power supply), that can receive the information from NFC tag 304 and/or can transmit information to vehicle 302. In some examples, communications device can include a reader (e.g., an NFC reader), such as a toll reader.

Communications device 316 can include a processor 317 a memory 318, such as a non-volatile memory, and an antenna 319. Memory 318 can include an NFC protocol that allows communications device 316 to communicate with NFC tag 304. For example, communications device 316 and NFC tag 304 can communicate using the NFC protocol, such as at about 13.56 mega-Hertz and according to the ISO/IEC 18000-3 international standard.

Communications device 316 can communicate with an operations center. For example, communications device 316 can be wirelessly coupled or hardwired to the communications center. In some examples, communications device 316 can communicate with the operations center via WIFI or over the Internet. Communications device 316 can energize NFC tag 304 when vehicle 302 brings antenna 310 within a communication distance of antenna 319, as described previously. The communication distance can be shorter and can provide better security than previous approaches that use RFID tags.

In some examples, communications device 316 can be a toll reader. For example, NFC tag 304 can transmit user information for paying the toll to communications device 316 in response to being energized by communications device 316. Communications device 316 can then send payment confirmation back to vehicle 302, in some instances.

In some examples, communications device 316 can receive real-time information from the operations center and can transmit that information to vehicle 302. For example, communications device 316 can transmit road conditions, weather conditions, traffic conditions, etc. to vehicle 302. In some examples, a number of communication devices 316 can embedded in a road along a route of vehicle 302, located at an entrance to a bridge, located in or on the walls of a tunnel, located in or on a road signs, traffic signals. For example, communication devices 316 can be located anywhere communication devices 104 and/or 204 can be located, as described previously.

Figure 4:
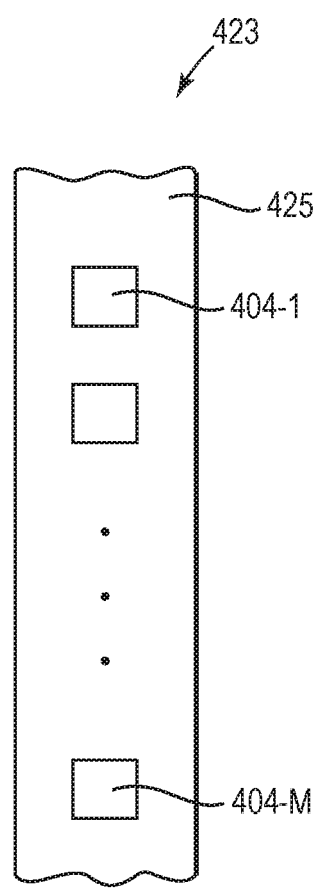
FIG. 4 illustrates an example of a removably attachable system of passive wireless communications devices, in accordance with a number of embodiments of the present disclosure.

FIG. 4 illustrates an example of a removably attachable system of wireless communications devices, in accordance with a number of embodiments of the present disclosure. In FIG. 4, a system 423 includes a number of passive wireless communication devices 404-1 to 404-M that can be as previously described for wireless communication devices 104-1 to 104-N, attached to an adhesive medium, such as adhesive tape 425. For example, each of wireless communication devices 404-1 to 404-M can be a wireless communications device 104. For example, wireless communication devices 404-1 to 404-M can be programmed to store information, as described previously.

System 423 can be removably (e.g., temporarily) attached to various surfaces, such as road surfaces, walls of tunnels, vehicles, road signs, traffic signals and the like, by removably attaching tape 425 to the surfaces. For example, system 423 can be removably attached in advance temporary situations, such as collisions, lane closures, road damage (e.g., potholes), and the like, to indicate the distance to the temporary situations and can be removed after the temporary situations no longer exist. In some examples, a system 423 can be applied to lane boundaries, such as around curves.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

What is claimed is:

1. A system, comprising
a number of first passive wireless communication devices embedded in a road along a route;
a second passive wireless communication device along the route;
a third passive wireless communication device located on a pedestrian along the route; and
a fourth passive wireless communication device located in each of a number of vehicles;
wherein respective first passive wireless communication devices of the number of first passive wireless communication devices store respective information about the route;
wherein the respective first passive wireless communication devices are configured to:
be energized by respective vehicles of the number of vehicles that pass by the respective first passive wireless communication devices; and
transmit their respective stored information to the respective vehicles in response to being energized by the respective vehicles;
wherein the second passive wireless communication device is configured to collect information about each respective vehicle that passes by the second passive wireless communication device, wherein the information about each respective vehicle includes a speed of each respective vehicle; and
wherein the third passive wireless communication device is configured to:
be energized by a number of vehicles that pass by the third passive wireless communication device; and
transmit information stored thereon to the number of vehicles in response to being energized thereby; and
wherein the fourth passive wireless communication device located in each of the number of vehicles is configured to provide information to an active communications device wirelessly coupled to an operations center.

2. The system of claim 1, wherein the number of vehicles is a subset of all vehicles that pass by the respective first passive wireless communication devices and the respective information about the route is specific to only the number of vehicles.

3. The system of claim 1, wherein the respective first passive wireless communication devices store the respective information about the route according to their respective locations in the road.

4. A method, comprising
providing a number of first passive wireless communication devices embedded in a road along a route;
providing a second passive wireless communication device along the route;
providing a third passive wireless communication device located on a pedestrian along the route; and
providing a fourth passive wireless communication device located in each of a number of vehicles;
storing, via respective first passive wireless communication devices of the number of first passive wireless communication devices, respective information about the route;
wherein the respective first passive wireless communication devices are configured to:
be energized by respective vehicles of the number of vehicles that pass by the respective first passive wireless communication devices; and
transmit their respective stored information to the respective vehicles in response to being energized by the respective vehicles;
collecting, via the second passive wireless communication device, information about each respective vehicle that passes by the second passive wireless communication device, wherein the information about each respective vehicle includes a speed of each respective vehicle; and
wherein the third passive wireless communication device is configured to:
be energized by a number of vehicles that pass by the third passive wireless communication device; and
transmit information stored thereon to the number of vehicles in response to being energized thereby; and
wherein the fourth passive wireless communication device located in each of the number of vehicles is configured to provide information to an active communications device wirelessly coupled to an operations center.

* * * * *